United States Patent [19]
Hartzband et al.

[11] Patent Number: 4,905,162
[45] Date of Patent: Feb. 27, 1990

[54] EVALUATION SYSTEM FOR DETERMINING ANALOGY AND SYMMETRIC COMPARISON AMONG OBJECTS IN MODEL-BASED COMPUTATION SYSTEMS

[75] Inventors: David J. Hartzband, Nashua, N.H.; Laura E. Holly, Groton, Mass.

[73] Assignee: Digital Equipment Corporation, Maynard, Mass.

[21] Appl. No.: 32,161

[22] Filed: Mar. 30, 1987

[51] Int. Cl.$^4$ .................... G06F 15/20; G06K 9/62
[52] U.S. Cl. ................................ 364/513; 382/30; 364/200; 364/274.4; 364/275.9; 364/300; 364/900; 364/972.2
[58] Field of Search ........ 364/513, 300, 200 MS File, 364/900 MS File; 382/14, 15, 30, 33, 34, 36, 50

[56] References Cited

U.S. PATENT DOCUMENTS

| | | | |
|---|---|---|---|
| 4,256,924 | 3/1981 | Sakoe | 364/513 X |
| 4,319,221 | 3/1982 | Sakoe | 364/513 X |
| 4,446,531 | 5/1984 | Tanaka | 364/728 |
| 4,467,437 | 8/1984 | Tsuruta et al. | 382/30 X |
| 4,606,069 | 8/1986 | Johnsen | 382/34 X |
| 4,620,286 | 10/1986 | Smith | 364/513 |
| 4,672,678 | 6/1987 | Koezuka et al. | 382/33 X |

OTHER PUBLICATIONS

Hartzband, David et al., International Journal of Approximate Reasoning, The Provision of Induction in Data Model Systems: I. Analogy, Elsevier Science Publishing Co, Inc. 52 Vanderbilt Ave., New York, NY 10017, 1:5-2, 1987.
Lenat, Douglas B. et al., Artificial Intelligence, Why AM and EURISKO Appear to Work*, Elsevier Science Publishers B.V. (North-Holland), vol. 23, 269-294, (1984).
Carbonell, Jamie G., Computer Science Department, Carnegie-Mellon University, Pittsburgh, Pa. 15213, Derivational Analogy: A Theory of Reconstructive Problem Solving and Expertise Acquisition, Mar. 1985.
Hartzband, D., Digital Equipment Corporation Technical Report 397 (DEC TR-397), The Anatomy of Knowledge Base Management. Proc. 1st Annual AI and Adv. Comp. Tech. Conf. Long Beach, Calif., 4/85, pp. 333-340.
David J. Hartzband, Digital Equipment Corporation, Enhancing Knowledge Representation in Engineering Databases, 1985 IEEE, pp. 39-48.
Barry G. Silverman, Systems Man, Cybernetics IEEE Trans. 13(6), Analogy in Systems Management: A Theoretical Inquiry, vol. SMC-13, No. 6, Nov./Dec. 1983, pp. 1049-1075.
Thomas G. Evans, Semantic Information Processing, The MIT Press, Cambridge, Mass., and London, England, A Program for the Solution of a Class of Gometric-Analogy Intelligence-Test Questions, pp. 271-353, (1968).
Donald S. Williams, Representation and Meaning Experiments with Information Processing Systems, Prentice-Hall, Inc., Englewood Cliffs, N.J., Computer Program Organization Induced from Problem Examples, pp. 143-205, (1972).
Amos Tversky, Psycological Review, American Psychological Association Inc., vol. 84, No. 4, Jan. 1977, Psycological Reviews, pp. 327-352.

*Primary Examiner*—Joseph Ruggiero
*Attorney, Agent, or Firm*—Fish & Richardson

[57] ABSTRACT

A mechanism for determining analogy and symmetric comparison among objects based on characteristics and weighting values provided by an operator or calling program. The characteristics of each object are defined in a reference table. A similarity table is constructed in which comparisons and differences between objects are detailed based on whether they possess similar characteristics. The weights are used to provide a quantitative measure of similarity and difference.

60 Claims, 8 Drawing Sheets

FIG. 1C ...
SIMILARITY TABLE 30

```
    OBJ_x ::=
10
    [: < ENTITY (ENT) >|    -11
        < ATTRIBUTE (ATR) >|  -12
        < RELATIONSHIP (REL) >|  -13
        < SET (SET)   >   :] -14
```

Fig. 1A

```
    Rs < OBJ_x > ::= < property_list >
20
            < property_list > ::=
                24-[ < ATR_x & VAL_x (numeric)....|
                    25-ATR_x & VAL_x (nonnumeric) > ....
                26-< REL_x & OBJ_x > ....
                23-< SET_x > ...
                    21-< REL_x > ....
                    22-< ATR_x > ... ]
```

Fig. 1B

FIG. 1C
SIMILARITY TABLE 30

```
AO ::=
   41 — 1.  Rs < OBJ_x > (Rs_x)
   42 — 2.  Rs < OBJ_y > (Rs_y)
         3.  Repeat
   43 —    a.  For each Rs_x_element_1(,...,n), compare
               Rs_y_element_1(,...,n)
   44 —    b.  If Rs_x_element_x(,...,n) = Rs_y_element_x(,...,n)
               then write element_x to EAO
   45 —  Until element_n
   46 — 4.  return EAO
```

51 — 1.  Rc < OBJ_x > (Rc-x)

Rc ::= < STAT_WEIGHT_LIST >

< STAT_WEIGHT_LIST > ::=

< property_list >< weight >< stats >

[ < ATR_x,...,j & VAL_x,...j (numeric, 1.0)|

< stats > ::=

Repeat
 52 — 1.  sum_a < ATR_x,...j & VAL_x,...,j >
 53 — 2.  count_a -> count x,...,j
 54 — 3.  m_a -> sum_a / count_a
 55 — 4.  sum_p -> (VAL_x,...j * VAL_x,...j)
 56 — 5.  v_a -> (sum_p - ((sum_a**2)/count_a)/(count_a-1))
 51 — 6.  d_a -> sqr(v_a)
 60 — 7.  l_m -> m_a - d_a
 61 — 8.  l_x -> m_a + d_a
            Until ATR_j Repeat
         ⎧ < ATR_j+1,...m u VAL_j+1,...m (nonnumeric, 1.0) > ....
         ⎪ < REL_j+1,...m u OBJ_j+1,...m (0.8) > ....
    62 ⎨ < SET_j+1,...m(1.5) > ....
         ⎪ < REL_j+1,...m (0.6) > ....
         ⎩ < ATR_j+1,...m (0.5) > ....]
            Until element_m 63
   — 2.  write m_ax, l_mx, l_xx to Rc_x
      3.  Repeat
```

Fig. 2B-1

```
        a.    Compare OBJ_x_elements_x,...m elements_x,...m ::=

< ATR_x,...m & VAL_x,...m (nonnumeric) >
64          < REL_x,...m & OBJ_y,...m > ....
                    < SET_x,...m > ....
                       < REL_x,...m > ....
                       < ATR_x,...m > ....

b.    If OBJ_x_element_x(,...,m) = OBJ_x_element_x+1(,...m)
65         write OBJ_x_element to Rc_x
     Until OBJ_x_element_m
66— 4. Generate Rc < OBJ_y > (Rw_y) as in A2:1-4
    5. Repeat
70—a.    Compare m_ax_ATR_1(,...,J;numeric)
         m_ay_ATR_1(,...,j;numeric)
71—b.    If l_m < m_ax_ATR_1 > l_x then sum < weight > and write
         weight sum and m_ax_ATR_1 to EA2
     Until m_ax_ATR_j 6. Repeat
72—a.    For each Rc_x_element_j+1(,...,m), compare
         Rc_y_element_j+1(,...,n)
73—b.    If Rc_x_element_j+1(,...,m) = Rc_y_element_j+1(,...,n)
         then sum < weight > element_x and write element_x and
         weight sum for all elements to EA2
     Until element_n 74—7. If weight sum EA2 > P then return true else return false
75—8. return EA2

80—1.  Rw < OBJ_x > (Rw_x)

⎧ 2.  Repeat
    ⎪    a.  for each Rw_x_ATR_y,...,n & VAL_y,...,n (numeric)
81 ⎨    b.  FIND OBJ_k,...1 with ATR_y,...,n & VAL_y,...n
    ⎪        (numeric)
    ⎩    c.  write OBJ_k,...,1 and weights to temp4a
         Until Rw_x_ATR_n & VAL_n ⎧ 3.  Repeat
    ⎪    a.  for each Rw_x_ATR_y,...,n & VAL_y,...,n (nonnumeric)
82 ⎨    b.  FIND OBJ_k,...1 with ATR_y,...,n & VAL_y,...n
    ⎪        (nonnumeric)
    ⎩    c.  Write OBJ_k,...,1 and weights to temp4b
         Until Rw_x_ATR_n & VAL_n 83—4.  Union temp4a & temp4b = EA4 and sum weights for each
       OBJ_k,...,1 in EA4

⎧ 5.  Repeat
    ⎪    a.  for each Rw_x_REL_y,...,n & OBJ_y,...,n
84 ⎨    b.  FIND OBJ_k,...1 with REL_y,...,n & OBJ_y,...n
    ⎪    c.  write OBJ_k,...,1 and weights to temp4c
    ⎩    Until Rw_x_REL_n & OBJ_n 85—6.  Union temp4c & EA4 = EA4 and sum weights for each
       OBJ_k,...,1 in EA4

⎧ 7.  Repeat
    ⎪    a.  for each Rw_x_SET_y,...,n
86 ⎨    b.  FIND OBJ_k,...1 with SET_y,...,n
    ⎪    c.  write OBJ_k,...,1 and weights to temp4d
    ⎩    Until Rw_x_SET_n 87 ⎧ 8.  Union temp4d & EA4 = EA4 and sum weights for each
   ⎩     OBJ_k,...,1 in EA4

90 ⎧ 9.  Repeat
   ⎩    a.  for each Rw_x_REL_y,...,n
```

Fig. 2C-1

```
        b.  FIND OBJ_k,...1 with REL_y,...,n
 90
        c.  write OBJ_k,...,1 and weights to temp4e
            Until Rw_x_REL_n
 91—10. Union temp4e & EA4 = EA4 and sum weights for each
            OBJ_k,...,n in EA4
    11. Repeat
     a. for each Rw_x_ATR_y,...,n
 92  b. FIND OBJ_k,...1 with ATR_y,...,n
     c. write OBJ_k,...,1 and weights to temp4f
            Until Rw_x_ATR_n
 93—12. Union temp4f & EA4 = EA4 and sum weights for each
            OBJ_k,...,1 in EA4
 94—13. Return each OBJ_k,...,1 in EA4 where weight sum >P
```

Fig. 2C-2

```
A1 ::=
     1. Rs < OBJ_x > (Rs_x)
     2. Rs < OBJ_y > (Rs_y)
     3. Repeat
      a. For each Rs_x_element_1(,...,n), compare
100      Rs_y_element_1(,...,n)
      b. If Rs_x_element_x(,...,n) = Rs_y_element_x(,...,n) then
            write element_x to EA1-0
      c. If Rs_x_element_x(,...,n) .NE. Rs_y_element_x(,...,n)
102      then write element_x to EA1_1
            Until element_n
103  4. return EA1-0
104  5. return EA1_1
```

```
1.  Rc < OBJ_x > (Rc_x)
 Rc ::= < STAT_WEIGHT_LIST >
     < STAT_WEIGHT_LIST > ::=
  < property_list >< weight >< stats >
      [ < ATR_x,...,j & VAL_x,...j (numeric, 1.0)|
  < stats > ::=
         Repeat
     1.  sum_a < ATR_x,...j & VAL_x,...,j >
     2.  count_a -> count x,...,j
        3.  m_a -> sum_a / count_a
     4.  sum_p -> (VAL_x,...j * VAL_x,...j)
     5.  v_a -> (sum_p - ((sum_a**2)/count_a)/(count_a-1))
     6.  d_a -> sqr(v_a)
     7.  l_m -> m_a - d_a
     8.  l_x -> m_a + d_a
         Until ATR_j
         Repeat
         < ATR_j+1,...m u VAL_j+1,...m (nonnumeric, 1.0) > ....
         < REL_j+1,...m u OBJ_j+1,...m (0.8)> ....
         < SET_j+1,...m (1.5) > ....
            < REL_j+1,...m (0.6) > ....
            < ATR_j+1,...m (0.5) > .... ]
         Until element_m
```

```
110—2.  write m_ax, l_mx, l_xx to Rc_x
111—3.  write ~m_ax,~l_mx,~l_xx to~Rc_x
     4.  Repeat
         a.  Compare OBJ_x_elements_x,...m
             elements_x,...m ::=
                 < ATR_x,...m & VAL_x,...m (nonnumeric) >
                     < REL_x,...m & OBJ_y,...m > ....
                         < SET_x,...m > ....
                             < REL_x,...m > ....
112                              < ATR_x,...m > ....

b.  If OBJ_x_element_x(,...,m) = OBJ_x_element_x+1(,...m)
             write OBJ_x_element to Rc_x
113— c.  If OBJ_x_element_x(,...,m) .NE.
             OBJ_x_element_x+1(,...m) write OBJ_x_element to ~Rc_x
         Until OBJ_x_element_m
114—5.  Generate Rc < OBJ_y > (Rw_y) as in A3:1-4
     6.  Repeat
         a.  Compare m_ax_ATR_1(,...,j;numeric),
115<         m_ay_ATR_1(,...,j;numeric)
         b.  If l_m < m_ax_ATR_1 > l_x then sum < weight > and
             write weight sum and m_ax_ATR_1 to EA3_0
116— c.  If l_m < ~m_ax_ATR_1 > l_x then sum < weight > and
             write weight sum and m_ax_ATR_1 to EA3_1
         Until m_ax_ATR_j 7.  Repeat
         a.  For each Rc_x_element_j+1(,...,m), compare
117<         Rc_y_element_j+1(,...,n)
         b.  If Rc_x_element_j+1(,...,m) =
             Rc_y_element_j+1(,...,n) then sum < weight >
             element_x and write element_x and weight sum for
             all elements to EA3_0
           c.  If Rc_x_element_j+1(,...,m) .NE.
120          Rc_y_element_j+1(,...,n) then sum < weight >
             element_x and write element_x and weight sum for
             all elements to EA3_1
         Until element_n
121—8.  If weight sum EA2 > P then return true else return false
     9.  return EA3_0
     10. return EA3-1
```

Fig. 3B-2

EVALUATION SYSTEM FOR DETERMINING ANALOGY AND SYMMETRIC COMPARISON AMONG OBJECTS IN MODEL-BASED COMPUTATION SYSTEMS

BACKGROUND OF THE INVENTION

1. Field of the Invention

The invention relates generally to the field of systems for model-based computation systems and artificial intelligence, and more specifically to systems for identifying and quantifying similarities and differences between and among data objects.

2. Background

One of the goals of computer science from very early in the field has been to provide an "intelligent" digital computing system, that is, to provide a digital computer which exhibits an artificial intelligence. One of the primary problems in artificial intelligence is analogical reasoning, which requires a determination of whether, and the degree to which, objects in a group of objects are similar. Each object in a group is essentially defined by a set of characteristics, and the group of objects is largely a database of the characteristics of the objects under scrutiny. The characteristics of the objects in the group may have been entered into the database by an operator. Alternatively, the computer itself may determine the characteristics of the objects under scrutiny if the computer has instruments or other means for determining the objects' characteristics; in this case, however, an operator normally will identify the relevant characteristics to the computer, as well has how to determine the characteristics.

Determining whether two objects in a group are identical is relatively simple. Essentially, all that need be done to determine if two objects are identical to one another is to perform a characteristic by characteristic comparison of the two objects. If all, or selected ones, of the characteristics match, the objects are identified as being identical, at least in regards the characteristics that are selected.

However, analogical reasoning cannot rely only on a determination that objects are identical. Normally, few objects in a group are identical to one another, and if the characteristics do not match, they will not be identified as being analogous. In addition, the similarity, or degree of analogy, between and among objects in a group also provides significant information about those objects which is useful in an analogical reasoning context. Accordingly, a substantial amount of effort has been expended to devise systems for performing analogical reasoning.

Initially, analogical reasoning was viewed as being essentially a form of inductive reasoning, primarily in connection with objects which were mathematical in nature. More recently, systems have been developed which are not limited to inductive reasoning. However, those systems require a high-level a priori knowledge of the objects being compared and the comparison to be performed.

In addition to analogy, which is related to a determination of the similarity among objects, symmetric comparison techniques have been devised which also take into account the differences between objects. In existing symmetric comparison techniques, the similarity and difference between two objects is represented as a function, specifically an inverse function, of the distance between the objects in a multidimensional space, with the number of dimensions in the space being the number of characteristics defining the objects. However, this approach becomes computationally unwieldy and difficult to interpret as the number of characteristics, and thus the number of dimensions, increases.

In addition, the multidimensional space approach to symmetric comparison assumes that the similarity judgements between objects is symmetric, since the distance in space is not dependent on the starting point for the measurement. However, in many instances, the similarity relationships between objects is not symmetric.

SUMMARY OF THE INVENTION

The invention provides a new and improved mechanism for providing a determination of the degree of similarity and difference between and among objects in a group.

In brief summary, a system is provided for use in connection with a plurality of objects each defined by a reference list which includes a set of characteristics of the object. The contents of the respective reference tables are compared, on a member by member basis, and the similarities and differences determined. A quantitative measure of the similarity and difference is determined based on weighting values provided by an operator or calling program, which weighting values identify a relative importance of the characteristic in the comparison.

DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1A through 1C depict data structures which are used in connection with the invention.

FIGS. 2A, 2B-1, 2B-2, 2C-1 and 2C-2 depict algorithms for determining analogy, and FIGS. 3A, 3B-1 and 3B-2 depict algorithms for determining symmetric comparison, in accordance with the invention, which use the data structures depicted in FIGS. 1A through 1C.

DETAILED DESCRIPTION OF AN ILLUSTRATIVE EMBODIMENT

1. Data Structures

The invention provides a new system for determining analogy and symmetric comparison among a plurality of objects in a group. The data structures will initially be described with reference to FIG. 1, comprising FIGS. 1A through 1C. The algorithms for determining analogy will be described with reference to FIG. 2, comprising FIGS. 2A through 2C, and the algorithms for determining symmetric comparison will be described in connection with FIG. 3, comprising FIGS. 3A and 3B.

With reference to FIGS. 1A and 1B, an object is defined by a structure including an object table 10 and a reference table 20 which contain characteristics of the object 10. The object is defined by a number of elements, including an ENT entity identification element 11, an ATR attribute element 12, a REL relationship element 13 and a SET set element 14. The ENT entity element includes an entry which identifies the object 10. The ATR attribute element 12 includes one or more entries which define attributes possessed by the object. The REL relationship element includes one or more entries which define relationships possessed by the object. Similarly, the SET set element 14 includes one or more entries which identify the sets to which the object belongs.

The reference table 20 also includes a number of elements as depicted in FIG. 1B. The reference table for the objects in the group includes an REL relationship element 21, an ATR attribute element 22, and a SET set element 23, which are the same as the corresponding respective elements 12, 13 and 14 in object table 10 (FIG. 1A). In addition, the reference table 20 includes the objects and values associated with the relationships and attributes recited in elements 21 and 22. Specifically, the reference table 20 includes an ATR & VAL (NUM) attribute and numeric value element 24 and an ATR & VAL (NON-NUM) attribute and non-numeric value element 25. Element 24 includes entries comprising the values of any numeric attributes and element 25 includes entries comprising the values of any non-numeric attributes associated with an object. In addition, the reference table 20 includes a REL & OBJ relationship and object element 26 which includes entries comprising the objects or values identifying each of the relationships contained in the REL relationship element 21.

The contents of each of the entries in elements 11 through 14 and 21 through 26, which comprise the characteristics of the object under scrutiny, are typically provided by an operator. Alternatively, they may be determined by the computer system in accordance with a program and constraints provided thereby. As a specific example of the elements comprising object table 10 and reference table 20, in a corporate data processing research and development environment, an object, representing an employee, may be defined by a table in which the ENT entity element 11 corresponds, for example, to the employee number. The ATR attribute element 12 may include entries having contents such as PROJECT_TYPE, which indicates that he is working on a project which has a type identification, and ACCOUNTING_CODE, which indicates that he, or his project, has an associated accounting code. The REL relationship element may include an entry with contents such as HAS_COST_CENTER, indicating that he or his group has a cost center number. In addition, the employee may have a SET element 14 which has a single entry whose contents are INFORMATION_MANAGEMENT_GROUP to indicate that he is a member of the information management group.

Continuing with the example, if the employee's project type is "research", the accounting code is "res" and the cost center is "306", the reference table 20 for the employee includes an ATR & VAL (NUM) attribute and numeric values element 24 which has no members. The ATR & VAL (NON-NUM) attribute and non-numeric values element 25 includes two entries, one entry associated with the attribute PROJECT_TYPE having the contents "RESEARCH" and the other entry associated with the attribute ACCOUNTING_CODE and having the contents "RES". In addition, the REL & OBJ relationship and object element 26 of the object's reference table 20 includes a single entry associated with the attribute HAS_COST_CENTER and having the contents "306".

The SET element 23, REL relationship element 21 and ATR attribute element 22 of the object's reference table 20 includes same entries as the corresponding elements in the object 10. That is, the SET element 23 has a single entry with contents INFORMATION_MANAGEMENT_GROUP, the REL relationship element 21 includes a single entry with contents HAS_COST_CENTER and the ATR attribute element 22 includes two entries with contents PROJECT_TYPE and ACCOUNTING_CODE.

The reference table 20 includes both the REL relationship element 21 and the REL & OBJ relationship and object element 26, and both the ATR attribute element 22 and ATR & VAL attribute and numeric and non-numeric value elements 24 and 25, for several reasons. Most notably, the fact that an object has a reference table 20 including a particular relationship entry and attribute entry provides information about characteristics of the object which are useful in determining the degree of similarity and difference between and among objects in a group, as will be made clear below.

As explained below in connection with the algorithms for analogy and symmetric comparison, the algorithms make use of a similarity table 30 depicted in FIG. 1C. With reference to FIG. 1C, the similarity table includes a number of records, each record having a plurality of fields. In the similarity table depicted in FIG. 1C, each record is a row, and the fields are the various columns in the table.

Thus, with reference to FIG. 1C, the similarity table 30 depicted there has eighteen records, each identified by a letter. Five records, namely records N through R, comprise an ATR attribute category associated with the ATR attribute elements 22 in the reference tables 20 of the objects OBJ_A through OBJ_n under scrutiny. Similarly, three records, namely records K through M, form an REL relationships category associated with the REL relationship elements in the reference tables 20, and two records, namely, records I and J, form a SET category associated with the SET element of the reference table. In addition, the similarity table 30 includes three records, namely records F through H, for receiving REL & OBJ relationship and object information, records D and E which form a ATR & vAL (NON-NUM) category for receiving non-numeric attribute and value information, and records A through C which form an ATR & VAL (NUM) for receiving numeric attribute and value information. It will be appreciated that the number of numeric and non-numeric attribute and value records A through E is the same as the number of attribute records N through R, and the number of REL & OBJ relationship and object records F through H is the same as the number of REL relationship records K through M.

The similarity table 30 includes object reference fields 31A through 31n (generally identified by reference numeral 31) the contents of which correspond to the contents of the entries of the reference tables 20 of each of the objects OBJ_A through OBJ_n under scrutiny. In the SET, REL relationship, and ATR attribute records in the similarity table 30, if two or more objects have the same members in their respective SET, REL relationship and ATR attribute entries in their reference table 20, the members are placed in the objects' fields 31 in the same record in the similarity table, otherwise they are placed in different records.

A record is established in the ATR & VAL (NON-NUM), ATR & VAL (NUM) and REL & OBJ categories in the similarity table 30 for receiving the specific numeric, non-numeric and object information associated with the REL relationship and ATR attribute records. Thus, it will be appreciated that, even if two or more objects OBJ_A through OBJ_n have the same relationships and attributes, the numeric, non-numeric or object associated therewith may be different. Thus, the contents of the fields in records A through H which receive such information may also be different. Thus, for example, two objects may have reference tables 20 having a HAS_COST_CENTER member in the REL relationship entry 21 (FIG. 1B), but the value of the REL & OBJ relationship and object entries may differ if their cost center numbers are different. Thus, one record is formed in the REL & OBJ category in the similarity table 30 for the HAS_COST_CENTER member, and the values associated therewith for the respective objects are entered in the fields in the record associated with the objects.

The similarity table 30 also includes a COMP comparison field 35 which receives a value against which the contents of the fields OBJ_A through OBJ_n may be compared. In addition, the similarity table 30 includes a SIM similarity field 32 which indicates the similarity, if any, between the contents of the fields 31A through 31n based on a similarity function. The similarity function is determined by the operator, or by a calling program. For example, one similarity function may require that an entry may be made in the SIM field of a record only if the contents of the OBJ_A through OBJ_n fields in the record are all the same. In that case, the entry corresponds to the contents of one of those fields. Alternatively, a similarity function may permit an entry to be made in the SIM field if some fraction, such as a majority of the contents of the OBJ_A through OBJ_n fields are the same, in which case that value would be copied into the SIM similarity field 32. In addition, if the contents of the fields 31A through 31n are numeric, a similarity function may allow that identity across all objects is not required; the function may, for example, determine an average and standard deviation for the values and determine similarity based on the number of entries within a range around the average determined by the standard deviation.

In addition, the entry table 30 includes a SCORE field 33 which receives a score based on the similarity as indicated by the similarity field and weights given by the operator or calling program to the corresponding entry of the reference table. Finally, a MAX maximum field receives the weights of the corresponding entry of the reference table as provided by the operator, regardless of the similarity between the similarity between the entries of the reference tables of the objects OBJ_A through OBJ_n under scrutiny. As will be explained in more detail later, the SCORE field 33 and the MAX maximum field 34 are used to determine normalized quantitative measures of the similarity between objects, based on weights provided by an operator or calling program. The weights represent a measure of the relative importance of an entry in determining degrees of similarity.

2. Algorithms

With this background, illustrative algorithms for analogy and symmetric comparison will now be described in connection with FIGS. 2A through 2C and 3A and 3B. In particular, three algorithms for analogy will be described, namely:

(A) simple analogy (FIG. 2A), which determines whether two objects are similar based on an element by element comparison of the elements in the objects' respective reference tables 20 (FIG. 1B);

(B) group quantitative analogy (FIG. 2B), which determines quantitatively the degree of similarity between two groups based on an element by element comparison of the elements in their respective reference tables 20 which are common in the two groups and quantitative weighting factors for the elements provided by an operator; and (C) unspecified quantitative analogy (FIG. 2C), which determines which objects of a group are similar to one of the objects to a selected degree, based on an element by element comparison of the elements in the reference tables quantitative weighting factors for the elements provided by the operator.

In addition, two algorithms for symmetric comparison will be described, namely:

(A) simple comparison (FIG. 3A), which determines the similarities and differences between two objected based on an element by element comparison of the elements in the objects' respective reference tables 20 (FIG. 1B); and (B) group quantitative comparison (FIG. 3B), which determines quantitatively the degree of similarity and difference between two groups based on an element by element comparison of the elements in their respective reference tables 20 which are common in the two groups and quantitative weighting factors for the elements provided by an operator.

A. Analogy Algorithms i. Simple Analogy

The simple analogy algorithm will be described in connection with FIG. 2A, which depicts the steps required for determining the similarities between objects OBJ_x and OBJ_y. With reference to FIG. 2A, the entries of all of the elements of the respective reference tables 20 associated with OBJ_x and OBJ_y are first copied into the first two fields 31A and 31B of the respective entries in the similarity table 30 (FIG. 1C) (steps 41 and 42). Thus, the collection of first fields 31A in the records in the similarity table 30 correspond to the entries of the reference table 20 associated with object OBJ_x. Similarly, the collection of second fields 31B in the records in the similarity table 30 correspond to the entries of the reference table 20 associated with object OBJ_y.

After the fields 31A and 31B in the entries in the similarity table have been written, a comparison operation is performed using steps 43 and 44. The contents of field 31A are first compared to the contents of field 31B in one of the entries in the similarity table (step 43). If there is a match between the contents of the two fields in the entry, the value is then entered in the SIM similarity field 32 of the record (step 44). Steps 43 and 44 are repeated for each of the records in the similarity table (step 45). Following step 45, the algorithm sequences to step 46, in which the similarity table 30, including the now completed SIM similarity field 32, is available to the operator or to a calling program.

It will be appreciated that the algorithm depicted in FIG. 2A essentially makes a comparison between the reference tables of the OBJ_x and OBJ_y objects on a record-by-record basis, and the similarity table 30, specifically the contents of the SIM fields 32 in the respective records, identifies the entries of the reference tables 20 of the two objects which are common.

The algorithm depicted in FIG. 2A may be extended to provide a numerical assessment of the degree of similarity between the two objects under scrutiny based on weights for each of the entries of the reference table provided by an operator or calling program. The weights for an entry of the reference table 20 is the same for all objects in the group having the associated entry, but the weights for the different entries of a reference table may differ. As each entry is processed in step 43 (FIG. 2A), the weight associated with the corresponding element of the reference table is entered into the MAX maximum field 34, and it is also into SCORE field 33 if there is a match between the contents of fields 31A and 31B and entered in SIM similarity field 32. After step 45 (FIG. 2A), that is, after all of the entries in the similarity table have been processed and entries made in the fields 32 through 34, the contents of the SCORE fields 33 in the records in the similarity table 30 are summed to provide a TOTAL SCORE figure. In addition, the contents of the MAX fields 34 in the records are summed to provide a TOTAL MAX figure. A ratio may then be formed between the TOTAL SCORE figure and the TOTAL MAX figure, which comprises a NORMALIZED SCORE figure. The NORMALIZED SCORE figure is then returned with the similarity table 30 as a quantitative measure of the similarity between the two objects OBJ_x and OBJ_y under scrutiny.

ii. Group Quantitative Analogy

The algorithm depicted in FIG. 2B determines the degree of similarity between two groups of objects, with one group comprising objects OBJ_x through OBJ_m and the other group comprising objects OBJ_y through OBJ_n. An object may be in both groups, and either group may be singular, that is, it may include one object. It will be appreciated that, if both groups include only one object, the algorithm is essentially the extension of the algorithm described above in connection with FIG. 2A.

The algorithm depicted in FIG. 2B provides a quantitative measure of the degree of similarity between two groups of objects, and returns a true or false indication which indicates whether the degree of similarity is more or less than a predetermined value. In particular, the algorithm first determines a similarity table for each group of objects based on the reference tables of the objects in the respective groups. A similarity table 30 (FIG. 1C) is generated for objects OBJ_x through OBJ_m and a second similarity table is generated for objects OBJ_y through OBJ_n. It will be appreciated that, for each similarity table, the contents of the SIM similarity fields 32 (FIG. 1C) essentially correspond to a reference table 20 (FIG. 1B) for the joint characteristics of the objects in the respective group.

The similarity tables 30 associated with the two groups, specifically their SIM fields, are then compared in another similarity table 30 to form a common similarity table. The common similarity table is similar in structure to similarity table 30 (FIG. 1C), with the contents of fields 31A and 31B corresponding to the contents of similarity fields 32 in the separate similarity tables 30 for each of the group.

The group quantitative analogy algorithm will now be described in connection with FIG. 2B. With reference to FIG. 2B, the algorithm first establishes a similarity table for objects OBJ_x through OBJ_m (step 50) based on their reference tables 20, the weights assigned by the operator, and a similarity function selected by the operator. In the example depicted in FIG. 2B, the similarity function for numeric values is selected to be a standard deviation (referenced by the sequence "stats" in the FIG.). The contents of numeric fields 31A through 31n are summed to provide value sum_a (step 52) and the number of such fields determined as count_a (step 53). The sum a value determined in step 52 is divided by the count_a value determined in step 53, the result of which is the average m_a (step 54) of the numeric values in the record, specifically in fields 31A through 31n in the record. The variation v_a is then determined (steps 55 and 56), and the deviation d_a is then determined as the square root of the variation determined in step 56 (step 57). Thereafter, the average value minus and plus the standard deviation value are determined as values 1_m and 1_x, respectively (steps 60 and 61) to provide the high and low ends of a range. This process may be repeated (step 62) for all of the records in the similarity table containing numeric information, or alternatively other similarity functions may be used in connection with other records containing numeric information. After the average m_a and the high and low ends 1_m and 1_x of the respective ranges have been determined, they are written into the COMP comparison field 35 in the respective records in the similarity table 30 (step 63). Similarly, the results of the operations on the other records in the similarity table are written into a corresponding field in those records.

Thereafter, the contents of the OBJ_A through OBJ_n fields in each record are compared to the contents of the COMP comparison field 35 (steps 64) and if there is a match the results are written into the SIM similarity field 32 (steps 65). A similarity table is then determined in the same way as described above for the second group of objects OBJ_y through OBJ_n.

Alternatively, the similarity table for the second group of objects OBJ_Y through OBJ_n may be part of the similarity table 30 for the first group of objects OBJ_X through OBJ_m; in that case two sets of fields corresponding to fields 31A through 31n will be provided, one for each of the groups of objects. In addition, two COMP comparison fields 35 are provided, one for each of the groups of objects. The result is essentially an interleaving of the OBJ_A through OBJ_n fields 31A through 31n and the COMP comparion fields of the similarity tables for the two groups of objects OBJ_x through OBJ_m and OBJ_y through OBJ_n into a single similarity table 30. In the following discussion, it will be assumed that one similarity table 30 is generated.

After the similarity table has been generated including fields for the two groups of objects OBJ_x through OBJ_m and OBJ_y through OBJ_m, the contents of the COMP comparison fields are compared in steps 70 through 73. In particular, steps 70 and 71 are used to compare the numeric information, and steps 72 and 73 are used to compare the non-numeric information in the respective records. Specifically, if, in steps 70 and 71, either average value m_a is within the range of the other, score value is determined. The score value may constitute the weighting value for the record assigned by the operation. Alternatively, the score may be determined based on weight multiplied by the fraction of fields 31A through 31n for both objects in the record which contain values within both ranges or either range. After the score value has been determined, it is loaded into the SCORE field 33 of the similarity table. In addition, the average values m_a are stored in the SIM similarity field 32 and the maximum weighting value is stored in the MAX field 34.

Similar operations are performed in steps 72 and 73 for the records containing non-numeric values. The contents of the SCORE fields 33 and the MAX maximum fields 34 in the records may be separately summed, and a ratio developed between them to provide a normalized similarity value (step 74). The normalized similarity value is compared to the predetermined similarity value provided by the operator and returns a true indication if it is greater than the predetermined similarity value, and otherwise a false indication. In addition, the resulting similarity table(s) is (are) returned to the operator or calling program.

iii. Unspecified Quantitative Analogy

The algorithm depicted in FIG. 2C determines the number of objects in a group of objects which are similar to a specified object to a similarity degree specified by the operator or by a calling program. Essentially, the algorithm, on a reference table entry basis, iteratively identifies the objects in the group which have a selected degree of similarity to the specified object. After each iteration, the identifications of the objects identified during the iteration, along with the weights associated with the reference table members, are written to a temporary list, which essentially serves as a similarity table, and the similarity score is determined for each object. It will be appreciated that, if an object identified during a one iteration is also identified during a later iteration, its identification need not be written to the temporary list. After the last iteration, that is, after all of the categories in the reference table have been processed, the identifications of the objects having similarities greater than a selected degree are returned to the operator or calling program.

With this background, the unspecified quantitative analogy algorithm will be described in connection with FIG. 2C. With reference to FIG. 2C, the reference table 20 of the specified object is determined (step 80). The objects in the group which have any member of the ATR & VAL (NUM) attribute and value (numeric) reference table entry which is similar to a corresponding member associated with the specified object are identified. Whether a member is similar may be based on a similarity function, as described above. The identifications of the objects and their respective reference tables, along with the weights assigned to the corresponding members, are stored in a TEMP4A temporary list (steps 81).

This procedure is repeated for the members of the ATR & VAL (NON-NUM) attribute and value (non-numeric) entry (steps 82) to provide a TEMP4B temporary list. The contents of the TEMP4A and TEMP4B temporary lists are combined (step 83) to form a similarity list, such that, if an object is identified on both temporary lists, it is entered only once in the similarity list. The degree of similarity between the specified object and each of the objects in the similarity list is determined as described above in connection with the simple analogy algorithm.

The process is repeated for all of the entries in the reference tables 20. That is, the objects in the groups which have any member of the REL & OBJ relation and object entry similar to the a member of the corresponding entry associated with the REL & OBJ relationship and object entry in the reference table 20 of the specified object are identified, and a TEMP4C temporary list formed (steps 84). The TEMP4C temporary list is then combined with the similarity list (step 85), and the degree of similarity between the specified object and each of the objects in the similarity list is again determined.

In steps 86 and 87, the operations performed in steps 84 and 85 are repeated in connection with the members of the SET entry of the specified object's reference table 20 which was formed in step 80. In steps 90 and 91, the operations performed in steps 84 and 85 are repeated in connection with the members of the REL relationships entry 21, and in steps 92 and 93, the operations performed in steps 84 and 85 are repeated in connection with the members of the ATR attribute entry 22 of the specified object's reference table 20. Following step 93, the identifications of the objects in the similarity list whose degrees of similarity are greater than the specified degree are returned to the operator or the calling program.

B. Symmetric Comparison Algorithms

The symmetric comparison algorithms depicted in FIGS. 3A and 3B provide extensions to the simple analogy algorithm depicted in FIG. 2A and the group quantitative analogy algorithm depicted in FIG. 2B, respectively, and introduce a measure of the differences between and among objects in the similarity determination. Specifically, in addition to the similarity determination described above in connection with FIGS. 2A and 2B, the symmetric comparison algorithms include steps in which the differences between and among objects are determined and quantified. In that, the characteristics which each object possesses which are not possessed by the other are noted and quantified to ensure that the differences comparison is symmetric. The similarity table 30 (FIG. 1C) may have additional fields (not shown) identifying the differences among contents of the fields 31A through 31n.

The symmetric comparison algorithms depicted in FIGS. 3A and 3B are similar to the corresponding analogy algorithms and thus will not be described in detail.

i. Simple Comparison Algorithm

With reference to FIG. 3A, the simple comparison algorithm is similar to the simple analogy algorithm, with the addition of a step which determines the differences between the objects under scrutiny and provides a differences table, which is similar to the similarity table 30, which is returned to the operator or calling program. Specifically, steps 100 are used to construct a similarity table 30 in the same way as steps 41 through 44 (FIG. 2A) in the simple analogy algorithm (FIG. 2A). If, however, the similarity function determines that the contents of two fields in a record in the similarity table are not similar, the values are stored in fields in the similarity table to identify the differences between the objects under scrutiny. The similarity table with the similarities (step 103) and differences (step 104) is returned to the operator or calling program.

ii. Group Quantitative Comparison Algorithm

With reference to FIG. 3B, the group quantitative comparison algorithm is similar to the group quantitative analogy algorithm (FIG. 2B). First, a similarity table is generated in connection with a first group of objects OBJ_x through OBJ_m. Steps 110 correspond to steps 51 through 62 (FIG. 2B) to determine the similarity function for a numeric record in the similarity table 30; the similarity function depicted in FIG. 3B, like the similarity function depicted in FIG. 2B, uses a similarity range based the average and standard deviation. After the similarity range is determined and written into the similarity table, the complement, that is, a dissimilarity range which corresponds to values outside of the similarity range, is determined and written into the similarity table (step 111). Steps 112 are also similar to steps 64 and 65 (FIG. 2B) of the group quantitative analogy algorithm in connection with similar non-numeric records, and step 113 is added in which the differences are written into a difference field in the similarity table 30. Step 114 is similar to step 66 to generate a similarity table for the second group of objects OBJ_y through OBJ_m.

Following step 114, steps 115, which correspond to steps 70 and 71 (FIG. 2B) of the group quantitative analogy algorithm, are performed to determine the degree of similarity between the corresponding numeric records in the similarity tables for the two groups. In addition, step 116 is used to determine the differences between the records. The results of steps 115 and 116 are provided in a similarity table. Steps 117, which correspond to steps 72 and 73 (FIG. 2B) of the group quantitative analogy algorithm, are performed to determine the degree of similarity between corresponding non-numeric records in the similarity tables for the two groups, and step 120 is used to determine the differences between records.

In steps 115 and 117, numerical similarity values are determined as described above in connection with the group quantitative analogy algorithm (FIG. 2B) and numerical difference values are determined in steps 116 and 120 in the same way. The numerical difference value is then subtracted from the numerical similarity value to provide a numerical symmetric comparison value. If the numerical symmetric comparison value is above a selected value, a true indication is returned to the operator or calling program, otherwise a false indication is returned (step 121), in the same manner as in step 74 (FIG. 2B) of the group quantitative analogy algorithm. Finally, the similarity tables are returned to the operator or calling program.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for determining a selected relationship among a plurality of objects each having a plurality of characteristics having diverse values, said system comprising:
   A. Association means for establishing associations among characteristics of said objects;
   B. comparison means for performing a selected similarity operation in connection with each of the values of associated ones of said objects' characteristics to determine a characteristic similarity value associated with said characteristics; and
   C. similarity determination means for performing a composite operation in response to the characteristic similarity values for determining a composite similarity value representing a degree of similarity among objects.

2. A system as defined in claim 1 wherein said association means includes similarity table establishment means for establishing a similarity table including a plurality of records each having a plurality of characteristic fields for receiving values of associated characteristics.

3. A system as defined in claim 2 in which each object has an associated reference table having a plurality of entries each storing a characteristic value, said similarity table establishment means using the objects' reference tables in establishing a similarity table.

4. A system as defined in claim 2 wherein said characteristics include type characteristics and value characteristics, each value characteristic being ancillary to a type characteristic, said similarity table establishment means establishing in said similarity table (i) records having characteristic fields for receiving values of associated type characteristic and (ii) other records having characteristic fields for receiving values of value characteristics ancillary to associated type characteristics.

5. A method for determining a selected relationship among a plurality of objects each having a plurality of characteristics having diverse values, said method comprising the steps of:
   A. establishing associations among characteristics of said objects;
   B. performing a selected similarity operation in connection with each of the values of associated ones of said objects' characteristics to determine a characteristic similarity value associated with said characteristics; and
   C. performing a composite operation in response to the characteristics similarity values for determining a composite similarity value representing a degree of similarity among objects.

6. A method as defined in claim 5 wherein said association step includes a step of establishing a similarity table including a plurality of records each having a plurality of characteristic fields for receiving values of associated characteristics.

7. A method as defined in claim 6 in which each object has an associated reference table having a plurality of entries each storing a characteristic value, the objects' reference tables being used in said similarity table establishment step in establishing a similarity table.

8. A method as defined in claim 6 wherein said characteristics include type characteristics and value characteristics, each value characteristic being ancillary to a type characteristic, said similarity table establishment step including steps of establishing in said similarity table (i) records having characteristic fields for receiving values of associated type characteristic and (ii) other records having characteristic fields for receiving values of value characteristics ancillary to associated type characteristics.

9. A system for determining a selected relationship between a plurality of objects each having characteristics, including type characteristics and value characteristics, each said value characteristic representing a value associated with a type characteristic, said characteristics being defined by entries in a reference table, said system comprising:
   A. similarity table establishment means for establishing a similarity table in response to the contents of the reference tables of said objects, said similarity table including a plurality of records, with each record having a plurality of characteristic fields for receiving associated type characteristics and value characteristics represented by the contents of corresponding entries in said reference tables of said objects;

B. comparison means for performing a similarity function in connection with the contents of the characteristic fields in each record in said similarity table to determine the degree of similarity between type characteristics and value characteristics defined by the contents of the respective fields; and C. similarity determination means responsive to the comparison determined by said comparison means for determining the degree of similarity between the respective objects.

10. A system as defined in claim 9 in which the reference table associated with each object has a type characteristic comprising at least one attribute identification and a value characteristic comprising an attribute value associated with each attribute identified by an attribute identification, said similarity table including a record comprising attribute identification fields for each different attribute identification for each object and a record associated with each attribute identification comprising fields for attribute values for the various objects, said comparison means operating in response to contents of said records to determine selected relationships between attribute identifications and attribute values associated with each of the respective attribute identifications.

11. A system as defined in claim 10 in which records in said similarity table further include weight value fields, said comparison means further operating in response to said weight value fields.

12. A system as defined in claim 10 in which the reference table associated with each object further has a type characteristic comprising at least one relationship identification and a value characteristic comprising a relationship object associated with each relationship identified by an relationship identification, said similarity table including a record comprising relationship identification fields for each different relationship identification for each object and a record associated with each relationship identification comprising fields for relationship objects associated with each object, said comparison means operating in response to contents of said records to determine selected relationships between relationship identifications and relationship objects associated with each of the respective relationship identifications.

13. A system as defined in claim 12 in which records in said similarity table further include weight value fields, said comparison means further operating in response to said weight value fields.

14. A system as defined in claim 12 in which the reference table associated with each object further has type characteristics comprising at least one set identification, said similarity table including a record comprising relationship identification fields for each different set identification associated with each object, said comparison means further operating in response to contents of said records to determine selected relationships between set identifications.

15. A system as defined in claim 14 in which records in said similarity table further include weight value fields, said comparison means further operating in response to said weight value fields.

16. A system as defined in claim 9 in which each record in said similarity table has an associated similarity value, said similarity determination means includes similarity value generating means for generating a similarity value comprising a similarity score in response to a comparison generated by said comparison means in connection with fields in each record and a maximum value generating means for generating a maximum similarity score in response to the similarity scores associated with all of said records.

17. A system as defined in claim 16 further comprising normalization means for generating a normalized similarity score in response to the similarity score generated by said similarity value generating means and the maximum similarity score generated by said maximum value generating means.

18. A system as defined in claim 17 further comprising iterative enabling means for iteratively enabling said similarity table means, said comparison means, said similarity determination means to iteratively operate in connection with a predetermined object and other objects, said similarity value generating means generating a similarity value in connection with each iteration, and similarity list means for establishing a similarity list for receiving, following each iteration, the identification of said other object if the similarity value has a predetermined relationship with a preselected value.

19. A system as defined in claim 9 in which each record further includes a similarity value identification field, said system further including similarity value identification field establishment means for establishing a similarity value in said similarity field in each record in response to the values in said characteristic fields and in response to the comparison operation by said comparison means.

20. A system as defined in claim 19 in which said similarity value identification field establishment means established the similarity value in each record as a function of the values in said characteristic fields.

21. A system as defined in claim 9 in which each of said objects is assigned to one of a plurality of groups, said system further comprising joint reference table establishing means for establishing a joint reference table associated with each of the groups, said similarity table means establishing a similarity table in response to the contents of the joint reference tables, said comparison means and said similarity determination means operating in response to the similarity table established by said similarity table means.

22. A system as defined in claim 21 in which

A. said joint reference table establishing means includes:

i. joint reference table means for establishing a joint reference table in response to the contents of the reference tables of said objects in a group, said joint reference table including a plurality of records, with each record having a plurality of characteristic fields for receiving associated type characteristics and value characteristics represented by the contents of corresponding entries in said reference tables of said objects, each record further including a joint reference field;

ii. joint comparison means for performing a comparison operation in connection with the contents of the characteristic fields in each record in said joint reference table to determine the degree of similarity between type characteristics and value characteristics defined by the contents of the respective fields; and iii. joint reference table similarity determination means for establishing the contents of said joint reference field in response to the contents of the characteristic fields and to the comparison determined by said comparison means;

B. said similarity table means thereafter establishing said similarity table in response to the contents of the joint reference fields of the respective joint reference tables associated with each of said groups.

23. A system as defined in claim 22 in which the reference table associated with each object has a type characteristic comprising at least one attribute identification and a value characteristic comprising an attribute value associated with each attribute identified by an attribute identification, said joint reference table means establishing each joint reference table to include a record comprising attribute identification fields for each different attribute identification for each object and a record associated with each attribute identification comprising fields for attribute values for the various objects, said joint comparison means operating in response to contents of said records to determine selected relationships between attribute identifications and attribute values associated with each of the respective attribute identifications.

24. A system as defined in claim 23 in which the reference table associated with each object further has a type characteristic comprising at least one relationship identification and a value characteristic comprising a relationship object associated with said each relationship identified by an relationship identification, said joint reference table means establishing in said joint reference table a record comprising relationship identification fields for each different relationship identification for each object in a group and a record associated with each relationship identification comprising fields for relationship objects associated with each object in a group, said joint comparison means operating in response to contents of said records to determine selected relationships between relationship identifications and relationship objects associated with each of the respective relationship identifications.

25. A system as defined in claim 24 in which the reference table associated with each object further has type characteristics comprising at least one set identification, said joint reference table means establishing in said joint reference table a record comprising relationship identification fields for each different set identification associated with each object, said comparison means further operating in response to contents of said records to determine selected relationships between set identifications.

26. A system as defined in claim 22 in which each record in said joint reference table further includes a weight value field which contains a weighting value and a joint weight value field, said joint reference table similarity determination means including means for establishing a joint weight value for storage in said joint weight value field in response to the weight value in said weight value field and the degree of similarity as determined by said joint comparison means.

27. A system as defined in claim 22 in which each record in said similarity table has an associated similarity value, said similarity determination means includes similarity value generating means for generating a similarity value comprising a similarity score in response to a comparison generated by said comparison means in connection with fields in each record and a maximum value generating means for generating a maximum similarity score in response to the similarity scores associated with all of said records.

28. A system as defined in claim 9 in which said similarity table means establishes, in each record, a similarity field and a difference field, said similarity determination means including means responsive to said comparison means for establishing values in said similarity field and said difference field in response to the comparison performed by said similarity determination means.

29. A system as defined in claim 28 in which said similarity determination means includes similarity value generating means and difference value generating means for generating, respectively, in response to a comparison generated by said comparison means in connection with said characteristic fields in each record, a similarity value comprising a similarity score for storage in said similarity field and a difference value comprising a difference score for storage in said difference field.

30. A system as defined in claim 29 in which said similarity determination means further includes maximum value generating means for generating a maximum similarity score in response to the similarity scores and difference scores associated with all of said records.

31. A system as defined in claim 30 further comprising normalization means for generating a normalized similarity score and a normalized difference score in response to, respectively, the similarity score generated by said similarity value generating means and the difference score generated by said difference score generating means, and the maximum similarity score generated by said maximum value means.

32. A system as defined in claim 28 in which each of said objects is assigned to one of a plurality of groups, said system further comprising joint reference table establishing means for establishing a joint reference table associated with each of the groups, said similarity table means establishing a similarity table in response to the contents of the joint reference tables, said comparison means and said similarity determination means operating in response to the similarity table established by said similarity table means.

33. A system as defined in claim 32 in which
A. said joint reference table establishing means includes:
  i. joint reference table means for establishing a joint reference table in response to the contents of the reference tables of said objects in a group, said joint reference table including a plurality of records, with each record having a plurality of characteristic fields for receiving associated type characteristics and value characteristics represented by the contents of corresponding entries in said reference tables of said objects, each record further including a joint similarity reference field and a joint difference reference field;
  ii. joint comparison means for performing a comparison operation in connection with the contents of the characteristic fields in each record in said joint reference table to determine the degree of similarity between type characteristics and value characteristics defined by the contents of the respective fields; and
  iii. joint reference table similarity determination means for establishing the contents of said joint similarity reference field and said joint difference reference field in response to the contents of the characteristic fields and to the comparison determined by said comparison means;

B. said similarity table means thereafter establishing said similarity table in response to the contents of the joint similarity reference fields and said joint difference reference fields of the respective joint reference tables associated with each of said groups.

34. A method of determining a selected relationship between a plurality of objects each having characteristics, including type characteristics and value characteristics, each said value characteristic representing a value associated with a type characteristic, said characteristics being defined by entries in a reference table, said system comprising:
   A. establishing a similarity table in response to the contents of the reference tables of said objects, said similarity table including a plurality of records, with each record having a plurality of characteristic fields for receiving associated type characteristics and value characteristics represented by the contents of corresponding entries in said reference tables of said objects;
   B. performing a similarity function in connection with the contents of the characteristic fields in each record in said similarity table to determine the degree of similarity between type characteristics and value characteristics defined by the contents of the respective fields; and
   C. determining the degree of similarity between the respective objects in response to the determined degree of similarity.

35. A method as defined in claim 34, in which records in said similarity table further include weight value fields, said similarity function being further performed in response to the contents of said weight value fields.

36. A method as defined in claim 34, in which each record in said similarity table have an associated similarity value, said similarity degree determination step including a similarity value generating step for generating a similarity value comprising a similarity score in response to the determined degree of similarity.

37. A method as defined in claim 36 further comprising a maximum value generating step for generating a maximum similarity score in response to the similarity scores associated with all of said records.

38. A method as defined in claim 37 further comprising a normalization step for generating a normalized similarity score in response to the similarity score and the maximum similarity score.

39. A method as defined in claim 37 in which said similarity table establishment step, said similarity function performance step and said similarity degree determination step are performed iteratively in connection with a predetermined object and other objects, said similarity value being generated in connection with each iteration, said method further comprising a similarity list establishment step for establishing a similarity list for including, following each iteration, the identification of said other object if the similarity value has a predetermined relationship with a preselected value.

40. A method as defined in claim 34 further including a similarity value identification field establishment step for establishing a similarity value in a similarity field in each record in response to the values in said characteristic fields and in response to the similarity function performance step.

41. A method as defined in claim 40 in which the similarity value in each record is established as a function of the values in said characteristic fields.

42. A method as defined in claim 34 in which each of said objects is assigned to one of a plurality of groups, said method further including the step of establishing a joint reference table associated with each of the groups, said similarity table thereafter being established in response to the contents of the joint reference tables.

43. A method as defined in claim 42 in which
   A. said joint reference table establishment step includes the steps of:
      i. establishing a joint reference table in response to the contents of the reference tables of said objects in a group, said joint reference table including a plurality of records, with each record having a plurality of characteristic fields for receiving associated type characteristics and value characteristics represented by the contents of corresponding entries in said reference tables of said objects, each record further including a joint reference field;
      ii. performing a comparison operation in connection with the contents of the characteristic fields in each record in said joint reference table to determine the degree of similarity between type characteristics and value characteristics defined by the contents of the respective fields; and
      iii. establishing the contents of said joint reference field in response to the contents of the characteristic fields and to the comparison determined by said comparison means;
   B. said similarity table thereafter being established in response to the contents of the joint reference fields of the respective joint reference tables associated with each of said groups.

44. A method as defined in claim 43 in which each record in said joint reference table further includes a weight value field which contains a weighting value and a joint weight value field, said joint reference field contents establishment step establishing a joint weight value for storage in said joint weight value field in response to the weight value in said weight value field and the degree of similarity as determined during said joint comparison step.

45. A method as defined in claim 40 in which each record in said similarity table has an associated similarity value, said similarity determination step including the step of generating a similarity score in response to the results of said similarity function in connection with fields in each record and a maximum similarity score in response to the similarity scores associated with all of said records.

46. A method as defined in claim 33 in which said similarity table includes, in each record, a similarity field and a difference field, said similarity determination step including steps of establishing values in said similarity field and said difference field in response to the results of said similarity degree determination step.

47. A method as defined in claim 46 in which each of said objects is assigned to one of a plurality of groups, said method further comprising the steps of establishing a joint reference table associated with each of the groups, said similarity table being established in response to the contents of the joint reference tables, similarity table so established being used during the similarity function performance step and said similarity degree determination step.

48. A method as defined in claim 47 in which
   A. said joint reference table establishing step includes the steps of: 'i. establishing a joint reference table in response to the contents of the reference tables of said objects in a group, said joint reference table including a plurality of records, with each record having a plurality of characteristic fields for receiving associated type characteristics and value characteristics represented by the contents of corresponding entries in said reference tables of said objects, each record further including a joint similarity reference field and a joint difference reference field;

ii. performing a joint comparison operation in connection with the contents of the characteristic fields in each record in said joint reference table to determine the degree of similarity between type characteristics and value characteristics defined by the contents of the respective fields; and iii. establishing the contents of said joint similarity reference field and said joint difference reference field in response to the contents of the characteristic fields and to the comparison determined by said comparison means;

B. said similarity table thereafter being established in response to the contents of the joint similarity reference fields and said joint difference reference fields of the respective joint reference tables associated with each of said groups.

49. A system for determining a selected relationship between a plurality of objects each having characteristics defined by entries in a reference table, said system comprising:

A. similarity table establishment means for establishing a similarity table in response to the contents of the reference tables of said objects, said similarity table including a plurality of records, with each record having a plurality of characteristic fields for receiving associated characteristics represented by the contents of corresponding entries in said reference tables of said objects, a similarity field and a difference field;

B. comparison means for performing a similarity function in connection with the contents of the characteristic fields in each record in said similarity table to determine the degree of similarity between characteristics defined by the contents of the respective fields; and C. similarity determination means responsive to the comparison determined by said comparison means for determining the degree of similarity between the respective objects and for establishing the values in said similarity field and said difference field of each record in response to the comparison performed by said similarity determination means.

50. A system as defined in claim 49 in which said similarity-determination means includes similarity value generating means and difference value generating means for generating, respectively, in response to a comparison generated by said comparison means in connection with said characteristic fields in each record, a similarity value comprising a similarity score for storage in said similarity field and a difference value comprising a difference score for storage in said difference field.

51. A system as defined in claim 50 in which said similarity determination means further includes maximum value generating means for generating a maximum similarity score in response to the similarity scores and difference scores associated with all of said records.

52. A system as defined in claim 51 further comprising normalization means for generating a normalized similarity score and a normalized difference score in response to, respectively, the similarity score generated by said similarity value generating means and the difference score generated by said difference score generating means, and the maximum similarity score generated by said maximum value generating means.

53. A system as defined in claim 49 in which each of said objects is assigned to one of a plurality of groups, said system further comprising joint reference table establishing means for establishing a joint reference table associated with each of the groups, said similarity table means establishing a similarity table in response to the contents of the joint reference tables, said comparison means and said similarity determination means operating in response to the similarity table established by said similarity table means.

54. A system as defined in claim 53 in which
A. said joint reference table establishing means includes:
  i. joint reference table means for establishing a joint reference table in response to the contents of the reference tables of said objects in a group, said joint reference table including a plurality of records, with each record having a plurality of characteristic fields for receiving associated type characteristics and value characteristics represented by the contents of corresponding entries in said reference tables of said objects, each record further including a joint similarity reference field and a joint difference reference field;
  ii. joint comparison means for performing a comparison operation in connection with the contents of the characteristic fields in each record in said joint reference table to determine the degree of similarity between type characteristics and value characteristics defined by the contents of the respective fields; and
  iii. joint reference table similarity determination means for establishing the contents of said joint similarity reference field and said joint difference reference field in response to the contents of the characteristic fields and to the comparison determined by said comparison means;
B. said similarity table means thereafter establishing said similarity table in response to the contents of the joint similarity reference fields and said joint difference reference fields of the respective joint reference tables associated with each of said groups.

55. A method of determining a selected relationship between a plurality of object each having characteristics defined by entries in a reference table, said system comprising:
A. establishing a similarity table in response to the contents of the reference tables of said objects, said similarity table including a plurality of records, with each record having a plurality of characteristic fields for receiving associated characteristics represented by the contents of corresponding entries in said reference tables of said objects, a similarity field and a difference field;
B. performing a similarity function in connection with the contents of the characteristic fields in each record in said similarity table to determine the degree of similarity between characteristics defined by the contents of the respective fields; and C. determining the degree of similarity between the respective objects and for establishing the values in said similarity field and said difference field of each record in response to the degree of similarity determined by said similarity function.

56. A method as defined in claim 55 in which said similarity determination step includes steps of generating, respectively, in response to a comparison generated by said comparison means in connection with said characteristic fields in each record, a similarity value comprising a similarity score for storage in said similarity field and a difference value comprising a difference score for storage in said difference field.

57. A method as defined in claim 56 in which said similarity determination step further includes the step of generating a maximum similarity score in response to the similarity scores and difference scores associated with all of said records.

58. A method as defined in claim 57 further comprising a normalization step for generating a normalized similarity score and a normalized difference score in response to, respectively, the similarity score and the difference score, and the maximum similarity score.

59. A method as defined n claim 55 in which each of said objects is assigned to one of a plurality of groups, said method further comprising a joint reference table establishing step for establishing a joint reference table associated with each of the groups, said similarity table means thereafter establishing a similarity table in response to the contents of the joint reference tables.

60. A method as defined in claim 59 in which
    A. said joint reference table establishing step includes steps of:
        i. establishing a joint reference table in response to the contents of the reference tables of said objects in a group, said joint reference table including a plurality of records, with each record having a plurality of characteristic fields, a joint similarity reference field and a joint difference reference field;
        ii. performing a joint comparison operation in connection with the contents of the characteristic fields in each record in said joint reference table to determine the degree of similarity between type characteristics and value characteristics defined by the contents of the respective fields; and
        iii. establishing the contents of said joint similarity reference field and said joint difference reference field in response to the contents of the characteristic fields and to the comparison determined by said comparison means;
    B. said similarity table thereafter being established in response to the contents of the joint similarity reference fields and said joint difference reference fields of the respective joint reference tables associated with each of said groups.

* * * * *

UNITED STATES PATENT AND TRADEMARK OFFICE
CERTIFICATE OF CORRECTION

PATENT NO.   : 4,905,162

DATED        : February 27, 1990

INVENTOR(S)  : David J. Hartzband

It is certified that error appears in the above-identified patent and that said Letters Patent is hereby corrected as shown below:

On the title page:

Item [75] Inventors: insert --Fred Maryanski--.

Column 5, line 51, delete "the similarity between".

Column 6, line 19, "objected" should be --objects--.

Column 12, line 30, "characteristics" should be --characteristic--.

Column 21, line 26, "n" should be --in--.

Signed and Sealed this

Seventh Day of January, 1992

Attest:

HARRY F. MANBECK, JR.

Attesting Officer

Commissioner of Patents and Trademarks